US008932977B2

(12) United States Patent
Dismukes et al.

(10) Patent No.: US 8,932,977 B2
(45) Date of Patent: Jan. 13, 2015

(54) SPINEL CATALYSTS FOR WATER AND HYDROCARBON OXIDATION

(75) Inventors: G. Charles Dismukes, Princeton, NJ (US); Martha Greenblatt, Highland Park, NJ (US)

(73) Assignee: Rutgers, The State University of New Jersey, New Brunswick, NJ (US)

(*) Notice: Subject to any disclaimer, the term of this patent is extended or adjusted under 35 U.S.C. 154(b) by 0 days.

(21) Appl. No.: 13/643,439

(22) PCT Filed: Jun. 24, 2011

(86) PCT No.: PCT/US2011/041886
§ 371 (c)(1),
(2), (4) Date: Oct. 25, 2012

(87) PCT Pub. No.: WO2011/163626
PCT Pub. Date: Dec. 29, 2011

(65) Prior Publication Data
US 2013/0040806 A1    Feb. 14, 2013

Related U.S. Application Data

(60) Provisional application No. 61/358,292, filed on Jun. 24, 2010.

(51) Int. Cl.
*B01J 23/00*     (2006.01)
*B01J 23/32*     (2006.01)
(Continued)

(52) U.S. Cl.
CPC ............. *C25B 1/003* (2013.01); *Y02E 60/366* (2013.01); *C25B 3/02* (2013.01); *B01J 35/004* (2013.01); *Y10S 502/524* (2013.01)
USPC ........... 502/159; 502/305; 502/309; 502/312; 502/315; 502/316; 502/317; 502/318; 502/319; 502/324; 502/325; 502/330; 502/331; 502/345; 502/350; 502/524; 204/290.01; 204/290.03; 204/242; 205/759; 29/25.03

(58) Field of Classification Search
USPC ......... 502/159, 524, 305, 309, 312, 315–319, 502/324, 325, 330, 331, 345, 350; 204/290.01, 290.03, 242; 205/759; 29/25.03
See application file for complete search history.

(56) References Cited

U.S. PATENT DOCUMENTS 4,607,020 A * 8/1986 Soled et al. ............. 502/177
4,618,597 A * 10/1986 Fiato et al. ............. 502/324
(Continued)

FOREIGN PATENT DOCUMENTS

WO    2008/116254    * 10/2008    ............. B01J 19/12
WO    2011/163626    * 12/2011    ............. C25B 3/02

OTHER PUBLICATIONS

Suryakal et al. "Synthesis and Electrochemical Characterization of LiMn2O4 and LiNd0.3Mn1.7O4 as Cathode for Lithium Ion Battery." Int. J. Electrochem. Sci. 3: 136-144. (2008).
(Continued)

*Primary Examiner* — Patricia L Hailey
(74) *Attorney, Agent, or Firm* — Fox Rothschild LLP

(57) ABSTRACT

A catalyst for the electrolysis of water molecules and hydrocarbons, the catalyst including catalytic groups comprising $A_{1-x}B_{2-y}B'_yO_4$ spinels having a cubical $M_4O_4$ core, wherein A is Li or Na, B and B' are independently any transition metal or main group metal, M is B, B', or both, x is a number from 0 to 1, and y is a number from 0 to 2. In photo-electrolytic applications, a plurality of catalytic groups are supported on a conductive support substrate capable of incorporating water molecules. At least some of the catalytic groups, supported by the support substrate, are able to catalytically interact with water molecules incorporated into the support substrate. The catalyst can also be used as part of a photo-electrochemical cell for the generation of electrical energy.

21 Claims, 14 Drawing Sheets

(51) Int. Cl.

| | | |
|---|---|---|
| *B01J 23/58* | (2006.01) | |
| *B01J 23/70* | (2006.01) | |
| *B01J 23/72* | (2006.01) | |
| *B01J 31/00* | (2006.01) | |
| *B23H 3/04* | (2006.01) | |
| *B23H 5/10* | (2006.01) | |
| *B23H 7/22* | (2006.01) | |
| *C02F 1/461* | (2006.01) | |
| *C25B 9/00* | (2006.01) | |
| *C25B 11/00* | (2006.01) | |
| *C25C 7/00* | (2006.01) | |
| *C25C 7/02* | (2006.01) | |
| *C25D 17/00* | (2006.01) | |
| *C25D 17/10* | (2006.01) | |
| *C25F 7/00* | (2006.01) | |
| *H01G 9/00* | (2006.01) | |
| *C25B 3/02* | (2006.01) | |
| *C25B 1/00* | (2006.01) | |
| *B01J 35/00* | (2006.01) | |

(56) References Cited

U.S. PATENT DOCUMENTS

| | | | |
|---|---|---|---|
| 5,238,898 A * | 8/1993 | Han et al. ............ 502/324 |
| 2008/0280753 A1 | 11/2008 | Watanabe et al. | |
| 2009/0253025 A1 | 10/2009 | Whitacre | |
| 2010/0133110 A1 | 6/2010 | Nocera et al. | |
| 2010/0143811 A1 | 6/2010 | Brimblecombe et al. | |

OTHER PUBLICATIONS

Meza, E. et al., "Lithium Cobalt Spinel Oxide: A Structural and Elctrochemical Study," Journal of the Chilean Chemical Society, vol. 1, No. 2, (Jan. 1, 2008) p. 1494.

Choi, S et al., "Chemical Synthesis and Properties of Spinel Li1-xC0204-[delta]" Journal of Solid State Chemistry, vol. 164, No. 2, (Mar. 1, 2002) pp. 332-338 (Abstract).

Akimoto, J et al., "High-pressure synthesis and crystal structure analysis of NaMn2O4 with the calcium ferrite-type structure" Journal of Solid State Chemistry, Orlando, Florida, US, vol. 179, No. 1, (Jan. 1, 2006) pp. 169-174.

Terasaki et al., "Large thermoelectric power in NaCo2O4 single crystals" Physical Review B, vol. 56, No. 20, (Nov. 1, 1997) pp. R12685-R12687.

Supplementary European Search Report, issued on Jul. 23, 2014, in European Application No. 11799014.

* cited by examiner

SPINEL CATALYSTS FOR WATER AND HYDROCARBON OXIDATION

CROSS-REFERENCE TO RELATED APPLICATIONS

This application is the U.S. National Phase of International Patent Application Serial No. PCT/US11/41886, filed on Jun. 24, 2011, which claims priority under 35 U.S.C. §119(e) to U.S. Provisional Patent Application Ser. No. 61/358,292, filed on Jun. 24, 2010, the disclosures of which are incorporated herein by reference in their entireties.

STATEMENT REGARDING FEDERALLY FUNDED RESEARCH

This invention was made with government support under Grant FA9550-05-1-0365 awarded by AFOSR-MURI. Accordingly, the U.S. Government has certain rights in this invention.

FIELD OF THE INVENTION

The present invention relates to novel transition metal oxide spinel catalysts, particularly $AB_2O_4$ spinels having a cubic $B_4O_4$ core, where B is a transition metal, and methods of catalytic water oxidation. The present invention also relates to methods for the synthesis of spinel materials that produce a range of particle sizes from nanometers to micron dimensions.

BACKGROUND OF THE INVENTION

The efficient conversion/storage of solar energy into chemical bond energy via the splitting of water into its elements—hydrogen ($H_2$) and oxygen ($O_2$)—represent a clean source of renewable fuel. Conventional electrolytic cells not only require a high pH, but also require operation at an overpotential that makes them unfeasible. A catalyst system may be used to reduce the overpotential to commercially practical levels. The catalyzed conversion of water into $O_2$, protons ($H^+$) into solution and electrons delivered to the protons can be used to make $H_2$ or to chemically reduce other molecules including carbon dioxide ($CO_2$). This technology can be applied in fuel cells for electricity production, and in electrolyzers and solar cells for production of $O_2$, $H_2$, and other hydrocarbon fuels. For example, a photoelectrochemical (PEC) cell or reverse fuel cell is a device for splitting water with energy from sunlight. The use of water as a source and sunlight as energy implies this technology is inherently sustainable and globally scalable, and could provide vast amounts of fuel (hydrogen), oxygen, and other hydrogenic precursors for reduction of carbon dioxide to hydrocarbon fuels from ordinary water.

Development of water oxidation catalysts to replace costly noble metals in commercial electrolyzers and solar fuel cells has been an unmet need preventing global development of hydrogen fuel technologies. Several metal oxides including $IrO_2$ and $RuO_2$ are already in use in industrial electrolyzers, but are made from rare and costly metals that are not globally scalable. Accordingly, there is a need for inexpensive electrodes made from earth-abundant elements.

Recent advances in methods for synthesizing transition metal oxide (TMO) nano-particles with the spinel structure in contact with proton conduction sites have produced more efficient catalysts for water oxidation that are suitable for renewable hydrogen production, when coupled with a proton reducing cathode. Such advances are applicable to energy storage problems inherent to intermittent solar energy conversion (i.e., photovoltaic (PV) and wind). One catalytic system capable of oxidizing water to molecular oxygen is the photosystem II water-oxidizing complex (PSII-WOC) found within photosynthetic organisms. PSII-WOC is expressed by the following equation (1):

$$2H_2O \rightarrow O_2 + 4H^+ + 4e^- \qquad (1)$$

The catalytic core of this enzyme is a $CaMn_4O_x$ cluster, which is conserved across all known species of oxygenic phototrophs. Many attempts to develop a biological water oxidation catalysts with a modest overpotential ($E_0$=1.23 V at pH=0) have focused on Ru and Ir based compounds, which are inherently resource limited.

The chemical principles that govern the PSII-WOC, specifically the Mn—O bonding, have been studied through catalytic water oxidation capabilities of structurally related synthetic molecular manganese-oxo complexes. Patent Application Publication No. US 2010/0143811 discloses $Mn_4O_4L_6$, where $Mn_4O_4$ is a manganese-oxo cubane core and L is a ligand stabilizing core such as $(C_6H_5)_2PO_2$ or $MeO(C_6H_5)_2PO_2$, as demonstrating catalytic activity. Recently, spinel-type $Co_3O_4$ nanoparticles have demonstrated catalytic capabilities. However, water oxidation activity by spinels has exhibited a strong dependence on crystallite size and surface area, frequently necessitating high overpotentials and alkaline conditions to accelerate the rate.

Accordingly, there is a need in the art for efficient water-oxidizing catalysts made from low-cost earth-abundant materials, particularly those used in connection with PECs. There also remains a need for a greater understanding of what limits the rate of turnover of reactants to products at photoelectrodes with complex three-dimensional architecture. Applicants have recognized a need for TMOs exhibiting high activities, simpler synthetic routes, and compatibility with PEC device fabrication. The present invention addresses these needs, among others.

SUMMARY OF THE INVENTION

Provided herein is a catalyst for the photo-electrolysis of water molecules, the catalyst including a catalytic group comprising $A_{1-x}B_{2-y}B'_yO_4$ spinels having a cubical $M_4O_4$ core, wherein A is Li or Na, B and B' are independently any transition metal or main group metal, M is B, B', or both, x is a number from 0 to 1, and y is a number from 0 to 2. In certain embodiments, B and B' are independently any 3d, 4d, or 5d transition metal. In certain preferred embodiments, B and B' are independently selected from the group consisting of Ti, V, Cr, Mn, Fe, Co, Ni, Cu, and combinations of these. In certain other embodiments, B and B' can also be selected from the group consisting of Al, Ga, in, Sn, Sb, and Bi.

According to another aspect of the invention the catalyst comprises: a catalytic group comprising $A_{1-x}B_{2-y}B'_yO_4$ spinels having a cubical $M_4O_4$ core, wherein A is Li or Na, B and B' are independently any transition metal or main group metal, M is B, B', or both, x is a number from 0 to 1, and y is a number from 0 to 2; a conductive support substrate supporting a plurality of the catalytic groups and capable of incorporating water molecules; wherein at least some of the catalytic groups supported by the support substrate are able to catalytically interact with water molecules incorporated into the support substrate.

Also provided herein is an anode for the electrolysis of water comprising: (1) an electrode substrate; and (2) a catalyst for the electrolysis of water molecules, the catalyst including (a) catalyst groups comprising $A_{1-x}B_{2-y}B'_yO_4$ spinels having a cubical $M_4O_4$ core, wherein A is Li or Na, B and B' are independently any transition metal or main group metal, M is B, B', or both, x is a number from 0 to 1, and y is a number from 0 to 2; and (b) a conductive support substrate supporting a plurality of the catalytic groups and capable of incorporating water molecules, wherein at least some of the catalytic groups supported by the substrate are able to catalytically interact with water molecules incorporated into the support substrate. In certain embodiments the anode is a photo-anode, wherein the catalyst is for the photo-electrolysis of water.

Also provided herein is an electrochemical cell for the electrolysis of water comprising: (1) a chamber capable of containing an aqueous electrolyte; (2) a cathode in contact with the aqueous electrolyte when the chamber contains the aqueous electrolyte; and (3) a anode comprising: (a) an electrode substrate; and (b) a catalyst for the electrolysis of water molecules, the catalyst comprising: (i) catalytic groups comprising $A_{1-x}B_{2-y}B'_yO_4$ spinels having a cubical $M_4O_4$ core, wherein A is Li or Na, and B and B' are independently any transition metal or main group metal, M is B, B', or both, x is a number from 0 to 1, and y is a number from 0 to 2; and (ii) a conductive support substrate supporting a plurality of the catalytic groups and capable of incorporated water molecules; wherein at least some of the catalytic groups supported by the support substrate are able to catalytically interact with water molecules incorporated into the support substrate, said anode capable of being electrically connected to said cathode in contact with the aqueous electrolyte when the chamber contains the aqueous electrolyte. In certain embodiments, the electrochemical cell is a photo-electrochemical cell, wherein the anode is a photo-anode, and the catalyst is for the photo-electrolysis of water.

Also provided herein is a method for preparing an electrochemical cell for use in the electrolysis of water, the method including the steps of: (i) providing a conductive support substrate capable of incorporating water molecules; (ii) allowing catalytic groups comprising $A_{1-x}B_{2-y}B'_yO_4$ spinels having a cubical $M_4O_4$ core, wherein A is Li or Na, B and B' are independently any transition metal or main group metal, M is B, B', or both, x is a number from 0 to 1, and y is a number from 0 to 2, to self-assemble on the support substrate so that at least some of the catalytic groups are able to catalytically interact with the water molecules; (iii) coating the support substrate having the catalytic groups assembled thereon onto an electrode substrate to provide an anode; (iv) providing a cathode and forming an electrical connection between the anode and the cathode; and (v) providing an aqueous electrolyte between the anode and the cathode to provide a photo-electrochemical cell.

Also featured herein is a method for preparing a photo-electrochemical cell for the light driven catalysis of water oxidation, the method including the steps of: (i) providing a semiconductor layer; (ii) coating a layer comprising a photo-electrochemical relay system onto the semi-conductor layer; (iii) coating a layer of a conductive support substrate capable of incorporating water molecules onto the semiconductor layer having the chemical relay system thereon; (iv) allowing catalytic groups comprising $A_{1-x}B_{2-y}B'_yO_4$ spinels having a cubical $M_4O_4$ core, wherein A is Li or Na, B and B' are independently any transition metal or main group metal, M is B, B', or both, x is a number from 0 to 1, and y is a number from 0 to 2, to self-assemble on the support substrate so that at least some of the catalytic groups are able to catalytically interact with the water molecules thereby forming a photo-anode; (v) providing a cathode and forming an electrical connection between the photo-anode and the cathode; and (vi) providing an aqueous electrolyte between the photo-anode and the cathode to provide a photo-electrochemical cell.

DETAILED DESCRIPTION OF THE INVENTION

Heterogeneous Inorganic Spinel Catalysts

Figures 1A, 1B, 1C:
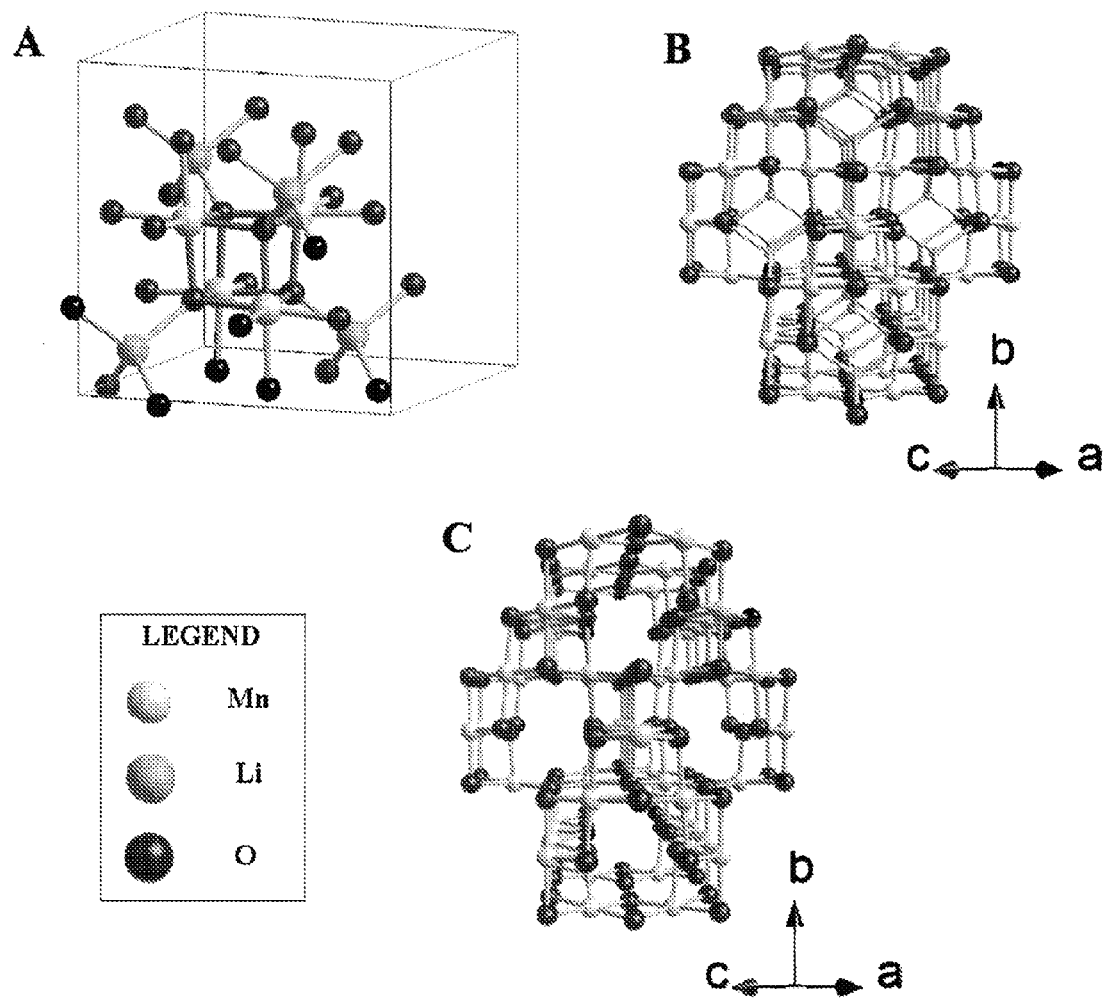
FIG. 1 is a perspective view of (A) the spinel type structure of $LiB_2O_4$, (B) an extended three-dimensional framework structure of $LiB_2O_4$, and (C) $\lambda$-$BO_2$.

The present invention relates to new classes of TMO spinel phases with nano-particle sizes or porous properties. More particularly, the present invention relates to TMO based heterogeneous catalysts capable of oxidizing water to $O_2$, and in particular water oxidation from the cubical $M_4O_4$ clusters of $A_{1-x}B_{2-y}B'_yO_4$ spinels, wherein A is Li or Na, B and B' are independently any transition metal or main group metal, M is B, B', or both, x is a number from 0 to 1, and y is a number from 0 to 2. The spinels are defined by their crystal structure which has a repeating cubic $M_4O_4$ core. In certain embodiments, B and B' are independently selected from the group consisting of Ti, V, Cr, Mn, Fe, Co, Ni, Cu, and combinations of these. Preferably, B and B' are independently selected from the group consisting of Mn and Co. In certain embodiments, B and B' can also be independently selected from the group consisting of Al, Ga, In, Sn, Sb, Bi, and combinations of these. In certain embodiments, the A site cations are partially or completely removed, and therefore comprise the spinel derivative $A_{1-x}B_2O_4$, wherein x is a number from 0 to 1. In certain embodiments the spinel may have a doped B site, and therefore comprise the spinel $AB_yB'_{2-y}O_4$, in which the B site is occupied by either of two distinct transition metals or main group metals, wherein y is a number from 0 to 2.

Spinels and inverse spinels have the composition $AB_2O_4$ (A=tetrahedral site cation, B=octahedral site cation). The spinel unit cell is depicted in FIG. 1. The charge on A+2B=8 in a pure spinel lacking impurities. Typically, in normal spinels the tetrahedral sites have divalent or monovalent cations, while the octahedral sites may have di-, tri-, or tetravalent cations. An inverse spinel can also form whereby one of the two trivalent ions at site B exchanges position with the divalent ion at A. $Fe_3O_4$ is an example of an inverse spinel. The B-site octahedrally coordinated cations form a cubical metal-oxo core, $[B_4O_4]^{4+}$ (in the typical case of B being trivalent, although higher or lower oxidation states, including tetravalent or divalent, are also possible).

It has been found that, in one embodiment, the cubical $B_4O_4$ units become highly active water oxidation catalysts when absorbed within a suitable proton-conducting polymer membrane that is immersed in an aqueous medium, illuminated with light and placed in contact with a suitable electrolysis cell. Such hybrid homogeneous-heterogeneous catalysts are active as thin layers in single layer arrangements and are incorporable into multi-layer arrangements.

In one embodiment of the present invention, $LiMn_2O_4$ has a spinel type structure ($AB_2O_4$) with Mn(III) and Mn(IV) ions occupying the octahedral B sites and the Li ions in the tetrahedral A sites as seen in FIG. 1. The present invention further relates to the exchange properties of $Li^+$ from $LiMn_2O_4$. $Li^+$ can be fully removed from the $LiMn_2O_4$ spinel framework yielding an polymorph of $MnO_2$ denoted $\lambda$-$MnO_2$. This material retains the spinel framework but with empty A sites, resulting in a uniquely open structure. $\lambda$-$MnO_2$ is not found naturally and differs from the common polymorph $\beta$-$MnO_2$ (rutile structure, all O atoms tricoordinate). The B cations in $\lambda$-$MnO_2$ and $LiMn_2O_4$ are organized as cubical $Mn_4O_4$ subunits that are linked to the other B site cations via oxo bridges (exclusively dicoordinate in $\lambda$-$MnO_2$). The cubical $Mn_4O_4$ units in $\lambda$-$MnO_2$ are topologically similar to the $Mn_4O_4$ core found in the molecular "cubane" catalysts used for water oxidation and indirectly the $CaMn_4O_4$ core of the PSII-WOC structure, as highlighted in FIG. 1. The delithiation of $LiMn_2O_4$ to form $\lambda$-$MnO_2$ by multiple methods creates an active water oxidation catalyst that is unusually robust and inexpensive compared to noble metals.

In one embodiment of the present invention, the $AB_2O_4$ spinels comprise $LiCo_2O_4$. $LiCoO_2$ occurs primarily in two crystalline forms (see FIG. 9); cubic spinel $LiCo_2O_4$ and rhombohedral layered $LiCoO_2$. Layered lithium cobalt oxide is an effective cathode material for lithium batteries with a higher energy density and better stability than the corresponding spinel. It has been found, however, that only the spinel phase of $LiCo_2O_4$ is active in catalyzing water oxidation, when driven either electrolytically or with a photo-chemically generated oxidant. In certain embodiments, the removal of lithium to produce spinel $Li_{1-x}Co_2O_4$, wherein x is a number between 0 and 1, demonstrates appreciable activity as a catalyst for water oxidation. As shown in FIG. 1, comparison of the atomic structures of spinel $Li_{1+y}Co_2O_4$ and layered $LiCoO_2$ reveals that only the spinel possesses cubic $Co_4O_4$ units within the lattice, while layered $LiCoO_2$ is comprised of $LiCo_3O_4$ units between layers of LiO. FIG. 1(b) shows alternating layers of Co—O and Li—O octahedral.

In certain embodiments, the doping of the B site of spinel $Li_{1-x}B_2O_4$ with other 3d-transition metal ions produces the mixed B' site spinel $Li_{1-x}B_{2-y}B'_yO_4$, wherein y is a number between 0 and 2. In certain embodiments, B and B' are each independently selected from the group consisting of Ti, V, Cr, Mn, Fe, Co, Ni, Cu, and combinations of these. In certain preferred embodiments, B comprises Mn and B' comprises Co. It has been found that spinel $Li_{1-x}Mn_{2-y}Co_yO_4$ produces a highly active water oxidation catalyst.

Support Substrates

According to another aspect of the invention the catalyst comprises a catalytic group and a conductive support substrate supporting a plurality of the catalytic groups. The support substrate is capable of incorporating water molecules, and at least some of the catalytic groups supported by the support substrate are able to catalytically interact with water molecules incorporated into the support substrate. In certain embodiments, the support substrate is a nano-porous substrate.

"Catalytic groups" include catalytic spinels that are able to catalyze the oxidation of water by interacting with water molecules. By "catalytically interact" it is meant that the oxidation of at least some of the water molecules that contact the catalytic groups is catalyzed by the catalytic groups. In certain embodiments, the catalytic groups include a conductive binder within which the catalytic spinels are dispersed. The conductive binder enables the application of a cohesive catalyst coating on the support substrate. Suitable binders include carbon paste or other nanoporous conducting material.

The support substrate is conductive to electrons so that when an electric potential difference is present across separate points on the support substrate, the mobile charges within the support substrate are forced to move, and an electric current is generated between those points. In one embodiment, the support substrate is rendered conductive by applying a thin layer of the support substrate onto a conductive material. Suitable conductive materials include glassy carbon, carbon nanotubes and nanospheres, fluoride doped tin oxide (FTO or ((F)$SnO_2$)) coated glass and indium tin oxide (ITO) coated glass, and multilayer structures having nanostructured semiconductor films coated onto the conductive substrates. Other means of causing the support substrate to be conductive are within the scope of the invention. For example, in one embodiment, the support substrate contacts a sensitized semiconductor.

Preferably, the support substrate has hydrophobic regions and hydrophilic regions. While not wishing to be limited by theory, it is thought that at least some of the catalytic groups can be supported in the hydrophobic regions of the support substrate and once supported are able to catalytically interact with water molecules in the hydrophilic regions. Effectively, the support substrate is thought to act as an interface between water molecules and the hydrophobic catalytic groups which are otherwise insoluble in aqueous solution.

In one embodiment, the hydrophobic regions are formed by a hydrophobic polymeric backbone and the hydrophilic regions are regions of ionizable functional groups, preferably on the polymer backbone that can serve as sites for proton conductance. Preferably the ionizable functional groups are sulfonate groups (—$SO_3H$) that lose a proton to form negatively charged sulfonate groups. Alternatively, the ionizable functional groups can form positively charged functional groups if preferred.

The support substrate can be, for example, polysulfones, polysulfonates, and polyphosphonates. In certain preferred embodiments, the supports substrate comprises a sulfonated fluoro-polymer (sold under the trade mark of Nafion®). The hydrophobic $CF_2CF(CF_3)O$— polymer backbone of Nafion® forms a hydrophobic solid that is penetrated by aqueous channels lined with the hydrophilic ionizable sulfonic acid groups. Investigations into the sub-structure of Nafion® coatings on solid surfaces have revealed that the polymer layers contains these hydrophilic channels throughout the otherwise hydrophobic regions of the membrane. These channels allow the diffusion of small molecules such as water.

Other support substrates that could be used include, for example, per-fluorinated sulfonic acid polymer cation-exchange membranes such as F-14100, F-930 and F-950, the GEFC perfluorinated proton exchange membranes, polysulfone ionomers, nanostructured films formed by metal oxide nanoparticles suitably decorated with organic acids including perfluorinated sulfonic acids, nanostructured films formed by the hydrolysis of alkoxysilanes suitably decorated with organic acids including perfluorinated sulfonic acids. Also within the scope are heterogeneous-homogeneous colloidal systems, two-phase mixtures (stabilized and unstabilized with surfactant), conducting polymers (e.g., poly(3,4-ethylenedioxythiophene) (PEDOT)), surface-modified silica and titania.

Any means of contacting the catalyst with water is within the scope of the invention. In one embodiment, the catalyst is immersed in a solution containing water molecules. The solution can be an aqueous solution containing electrolyte. In another embodiment, the aqueous solution can be a solution from which the water is preferentially removed (i.e., solid liquid separation). For example, where the aqueous solution is salt water or sea water the water could be removed leaving the salt behind (i.e., desalination). In one embodiment about 0.1 M electrolyte is sufficient.

It has been found that the present catalyst works effectively in salt water. It is known that at 1.35 V chloride ions in the salt water react to form chlorinated by-products which are undesirable and render the desalination process energy intensive. Accordingly, the potential applied in these electrolysis and photoelectrochemical cells is lower than 1.35 V to avoid these undesirable reactions.

Synthesis

Spinels of the present invention, such as $LiMn_2O_4$ and $LiCo_2O_4$, are synthesized as nanoscopic particles using low temperature methods and mild treatments, including sol-gel, ultrasonic and electrolytic methods for comparison to traditional high temperature aerobic oxidation. For example, electrosynthesis of spinel $Mn_3O_4$ from $Mn^{2+}_{(aq)}$ may be carried out within the aqueous channels of a Nafion® polymer, a proton conducting material used in fuel cells, attached to an electrode. Chelating ligands (carbonates, borates, oxalates) may be used to stabilize formation of $Mn^{3+}$ and $Mn^{4+}$ oxides at electrochemical potentials sufficient to oxidize $Mn^{2+}_{(aq)}$, thus enabling control of the TMO phase over a wide range of pH that is not feasible with thermal methods. Accordingly, nanocubes (50-60 nm) of spinels (e.g., $Co_3O_4$ or $Mn_3O_4$) active in water oxidation have been produced.

The synthesis of nano-porous spinels is also carried out by removal of the A site cation, which leaves channels capable of water/proton transport and enables new soft modes of lattice displacements that flex the $[B_4O_4]$ core. For example, $Li^+$ is removed from the spinel $LiMn_2O_4$ by treatment with mild aqueous acid (pH<2.5). This results in complete conversion to nearly pure $MnO_2$. The resulting material, designated $\lambda$-$MnO_2$, preserves the structural framework of the original spinel, but with most or all of the $Li^+$ removed from the tetrahedral sites while the octahedral sites become oxidized completely to $Mn^{IV}$. This transformation produces the $[Mn_4O_4]^{8+}$ redox state at the B site cluster. The resulting $\lambda$-$MnO_2$ may be used as a water oxidation catalyst.

In preferred embodiments of the preparation of $LiMn_2O_4$ and $\lambda$-$MnO_2$, $LiMn_2O_4$ can be synthesized by two synthetic procedures to generate $LiMn_2O_4$. In a high temperature embodiment, $Li_2CO_3$ and $Mn_2O_3$ are heated at a temperature of about 850° C. to form $LiMn_2O_4$ crystallites greater than 500 nm in size. In a low temperature embodiment, $Mn(OAc)_2$ is combined with $LiNO_3$ at a temperature of about 350° C. in the presence of urea and citrate in acidic solution, which enables the formation of a nanoscopic material during degassing of $H_2O$, $NH_3$, and $CO_2$. The reaction of $Mn(OAc)_2$ and $LiNO_3$ in acidic solution generates the $LiMn_2O_4$ spinel crystal phase. In order to ensure nanoparticle size distribution, crystal growth is controlled using urea and citrate in solution forming a porous polymeric network. Removal of the Li atoms is performed by: (1) dilute $HNO_3$ solution treatment; or (2) treatment with $Br_2$. The acid treatment dissolves the $Li_2O$ and MnO products of the reaction and yields a solid that analyzes gravimetrically as $\lambda$-$MnO_2$ with 100% removal of $Li^+$. This reaction is expressed in the following equation (2):

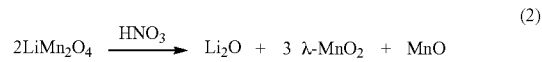

$$2LiMn_2O_4 \xrightarrow{HNO_3} Li_2O + 3 \text{ } \lambda\text{-}MnO_2 + MnO \qquad (2)$$

Figure 9:
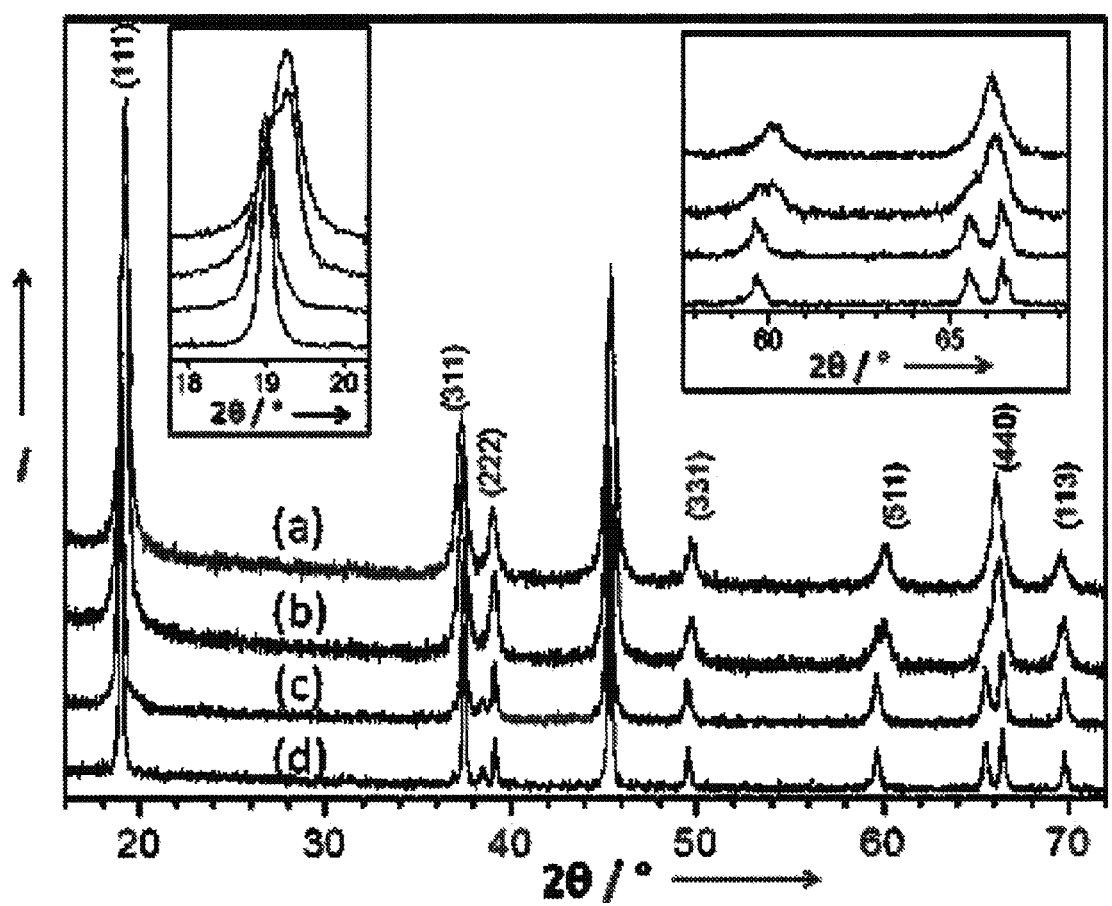
FIG. 9 illustrates powder X-ray diffraction patterns of lithium cobalt oxide calcined at (a) 400° C., (b) 500° C., (c) 600° C., and (d) 700° C.; insets show the phase transformation from spinel to layered as the calcination temperature increases.
Figure 10:
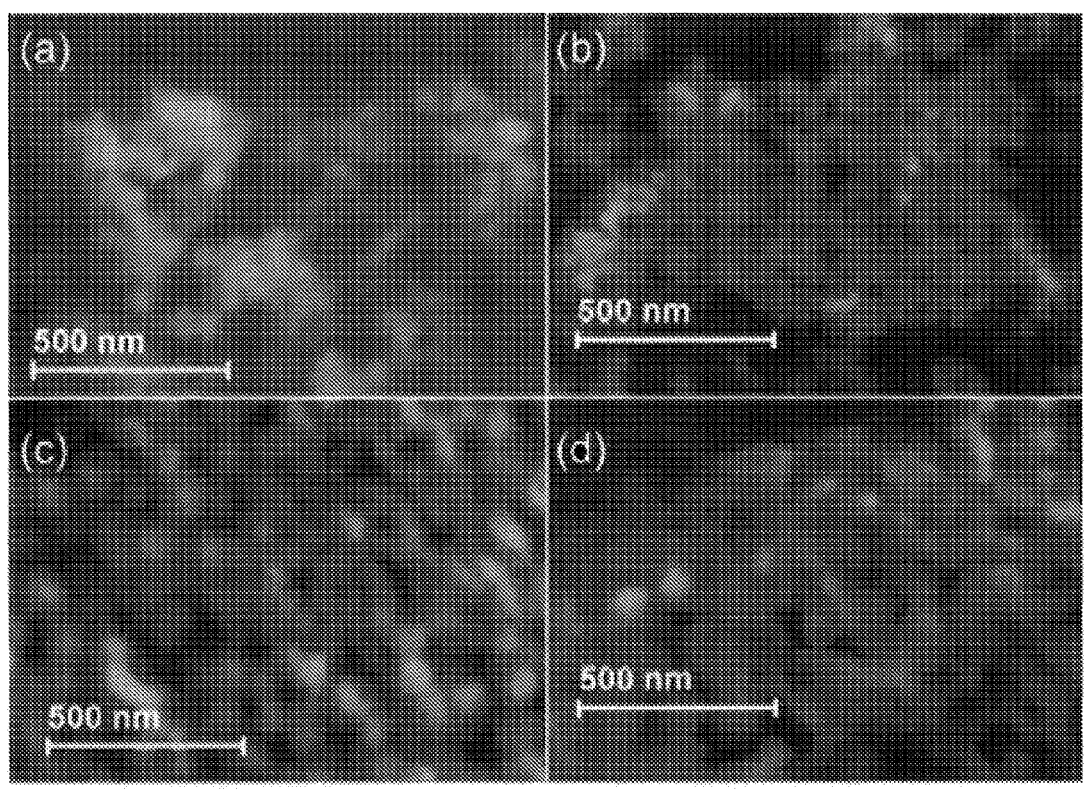
FIG. 10 illustrates SEM images of lithium cobalt oxides calcined at (a) 400° C., (b) 500° C., (c) 600° C., and 700° C., wherein the average particle size is 50 nm in the 400° C. sample and 100 nm in the 700° C. sample.

In preferred embodiments a sol-gel method is also used for the preparation of spinel $LiCo_2O_4$. An aqueous solution of $LiNO_3$, $Co(NO_3)_2 \cdot 6H_2O$, citric acid and urea was evaporated at 80° C. for 4-6 hours. The precursor powder was then decomposed at different temperatures (400° C., 500° C., 600° C., and 700° C.) for 1-2 hours. The products were characterized by powder X-ray diffraction, as illustrated in FIG. 9, and scanning electron microscopy, as illustrated in FIG. 10.

Catalytic Oxidation of Water and Hydrocarbons

One aspect of the present invention relates to methods of catalysis of oxidation reactions, where the catalysts comprise nanoparticulate spinels and their delithiated analogs, and wherein the oxidation uses energy in the form of light, electricity or heat. The spinels are used either as free unmodified materials or supported on another material. Examples of co-supports include electrically conducting, semi-conducting and non-conducting supports such as metals, metal oxides, semiconductors, conducting and non-conducting organic polymers, and so forth.

In another aspect, the present invention is related to partial or selective oxidation of water, hydrocarbons, or other sources of hydrogen fuel with oxygen gas as the oxidant, heat as the energy source and the spinel phase as the catalyst. In certain preferred embodiments, the thermal conversion of the hydrogen fuel occurs via a flow reactor incorporating a catalyst of the present invention. Those of ordinary skill in the art would understand how a catalyst of the present invention can be incorporated in a flow reactor. In one embodiment, the hydrogen fuel comprises hydrocarbons. In particularly preferred embodiments methane is converted to methanol. In another preferred embodiment, propane is converted to propanol. The spinel catalyzes the selective transfer of an oxygen atom to the hydrocarbon, while air provides the source of oxygen. In this regard, gaseous reactants may be oxidized at temperatures of up to about 500° C.

When dissolved in organic solution, the spinels of the present invention can act as a powerful catalyst for the oxidation of a range of organic reagents. Accordingly, in certain embodiments, the spinels of the present invention are capable of catalyzing the following reactions:

Water oxidation anode reaction:

$$2H_2O \rightarrow O_2 + 4e^- + 4H^+$$

Water splitting (anode and cathode reactions):

$$2H_2O \rightarrow O_2 + 2H_2$$

Partial deoxygenation of carbon dioxide:

$$2CO_2 \rightarrow O_2 + 2CO$$

Reduction of carbon dioxide to formic acid:

$$H_2O + CO_2 \rightarrow HCOOH + \tfrac{1}{2}O_2$$

Reduction of carbon dioxide to methanol:

$$2H_2O + CO_2 \rightarrow CH_3OH + 3/2O_2$$

Reduction of carbon dioxide to methane:

$$2H_2O + CO_2 \rightarrow CH_4 + 2O_2$$

Partial oxidation of methane and hydrocarbons:

$$CH_4 + \tfrac{1}{2}O_2 \rightarrow CH_3OH$$

$$(CH_2)_x + \tfrac{1}{2}O_2 \rightarrow (CHOH)_x$$

Electrolysis and Photoelectrochemical Cells

In yet another aspect, the present invention is related to methods of use of the inventive spinel catalysts in anodes and photoanodes for electrolysis and photoelectrochemical cells. The spinels are permanently bonded to conductive metal surfaces and electrically biased at electrical potentials that support the electro-oxidation of the aforementioned sources of hydrogenic fuels. The spinel catalysts are used in both polymer membrane type electrolyzers and solid oxide fuel cells. Such catalytic oxidation is carried out by electricity from any source, preferably generated from solar or wind sources. In embodiments comprising solar cells, the spinel-coated anodes are driven by electricity generated from a photovoltaic or semiconductor source in an integrated photoelectrochemical cell. The electrolysis and photoelectrochemical (PEC) applications are carried out in electrolytes having a pH ranging from alkaline to acidic.

The electrolytes carry protons between the anode and cathode. In certain embodiments in which water is oxidized, the electrolyte is separated from the water. To this end, the support substrates (described above) comprises, on a first side, flow fields allowing water to flow to the anode (as well as removal of $O_2$ gas), and on a second side, and water flow fields allowing to the cathode to provide cooling and removal of $H_2$ gas. Accordingly, protons travel through the support substrate. In certain other embodiments, the electrolyte is not separated from the water, thereby enabling protons to travel through the water phase.

In one embodiment, the catalyst of the invention is formed on an electrode substrate to provide a photo-anode. The electrode substrate can be any suitable substrate, for example, glass. As mentioned above, the glass could be coated with, for example, indium tin oxide to render the support substrate conductive. In some embodiments there are multiple layers between the electrode substrate and the catalyst. These layers can replace the conductive material (e.g., indium tin oxide) applied to the electrode substrate. The layers can include a semiconductor and a chemical relay system material.

The incorporation of a photo-electrochemical relay system into the photo-anode improves the overall efficiency of the catalysis of water oxidation. The chemical relay system may be a photo-electrochemical relay such as a dye that absorbs light and facilitates electron transfer. A thin layer of the catalyst can be in contact with the chemical relay system. The chemical relay includes polymers possessing cation exchange groups (e.g., sulfonates) that facilitate proton exchange with water and photo-active dyes such as ruthenium N-donor dyes that absorb in regions of the electromagnetic spectrum that are not absorbed by the catalytic clusters. The ruthenium N-donor dyes absorb visible light and then electrochemically oxidize the catalytic groups. This enhances the efficiency with which light in the visible region is converted into chemical energy overall, since the catalytic groups typically do not absorb visible light strongly.

The photo-anode of the invention can be used in a photo-electrochemical cell for the electrolysis of water. The cell can comprise a chamber capable of containing an aqueous electrolyte. The chamber can be bounded by walls so as to contain the aqueous electrolyte within it, or open to allow the aqueous electrolyte to flow through it. The photo-electrochemical cell includes the photo-anode in combination with a cathode, both of which are able to contact the aqueous electrolyte when it is present. When the cell is used, the photo-anode is electrically connected to the said cathode in order to complete the electrical circuit.

Examples of suitable cathode materials include supported platinum nanoparticles, supported nickel nanoparticles and supported nickel alloys. The supports include electrically conductive substrates such as carbon paste, carbon nanoparticles, or intrinsically conductive polymers including, for example, polyanilines, polythiophenes (PEDOT), and polyacrylamides.

The photo-electrochemical cell can be used in a method of generating hydrogen and oxygen. Effectively, the cell is exposed to light radiation in order to activate the catalytic groups. When the cell is absent a photo-electrochemical relay system, an electric potential is applied to encourage the regeneration of the catalytic groups once they have undertaken one catalytic cycle. The cell is capable of producing hydrogen and oxygen gases which can be collected or immediately used in a further application as desired. In certain embodiments collection is capable wherein the cell is operated at pressures of greater than or equal to about 1 atm. within a pressure secure reactor that is capable of pressures in the range of about 1 to about 400 atm.

Alternatively, the photo-electrochemical cell can be used in a method of generating electricity (i.e., an electric current). Where a chemical relay system is present in the photo-anode, to generate electricity all that is required is exposure of the cell to light radiation such as sunlight.

Optionally, the hydrogen and oxygen generated by the photo-electrochemical cell described above can be passed into a fuel cell for the generation of electrical energy.

In some embodiments, a plurality of photo-electrochemical cells are arranged in a series.

The invention also provides a method for preparing an electrochemical cell for use in the electrolysis of water, the method including the steps of: (i) providing a conductive support substrate capable of incorporating water molecules; (ii) allowing catalytic groups comprising $A_{1-x}B_{2-y}B'_yO_4$ spinels, wherein A is Li or Na, B and B' are independently any transition metal or main group metal, x is a number from 0 to 1, and y is a number from 0 to 2, to self-assemble on the support substrate so that at least some of the catalytic groups are able to catalytically interact with the water molecules; (iii) coating the support substrate having the catalytic groups assembled thereon onto an electrode substrate to provide an anode; (iv) providing a cathode and forming an electrical connection between the anode and the cathode; and (v) providing an aqueous electrolyte between the anode and the cathode to provide an electrochemical cell. In certain embodiments, the electrochemical cell is a photo-electrochemical cell for use in the photo-electrolysis of water, wherein the anode is a photo-anode.

According to yet a further aspect of the invention there is provided a method for preparing a photo-electrochemical cell for the catalysis of water, the method including the steps of: (i) providing a semiconductor layer; (ii) coating a layer comprising a photo-electrochemical relay system onto the semiconductor layer; (iii) coating a layer of a conductive support substrate capable of incorporating water molecules onto the semiconductor layer having the chemical relay system thereon; (iv) allowing catalytic groups comprising $A_{1-x}B_{2-y}B'_yO_4$ spinels, wherein A is Li or Na, B and B' are independently any transition metal or main group, x is a number from 0 to 1, and y is a number from 0 to 2, to self-assemble on the support substrate so that at least some of the catalytic groups are able to catalytically interact with the water molecules thereby forming a photo-anode; (v) providing a cathode and forming an electrical connection between the photo-anode and the cathode; and (vi) providing an aqueous electrolyte between the photo-anode and the cathode to provide a photo-electrochemical cell.

EXAMPLES

The following examples are meant to illustrate, not limit, the scope of the invention.

Materials and Methods for Synthesis and Characterization of $\lambda$-$MnO_2$

All reactants were reagent grade and used as purchased without further purification. Thermal analyses were performed on a TA Instrument 2050 thermal analyzer from room temperature to 600° C. with a heating rate of 5° C./min in nitrogen. $LiMn_2O_4$ and $\lambda$-$MnO_2$ particle morphologies and sizes were observed by scanning electron microscopy (Zeiss Sigma Field Emission SEM with Oxford EDSLEO FESEM). The X-ray powder diffraction patterns of the powders were collected on a Bruker D8 Advance diffractometer (Bragg-Brentano geometry, CuK$\alpha$ radiation). Data were collected for oxygen evolution on the Clark type oxygen electrode (Hansatek Ltd.) and calibrated with a deoxygenated solution and an oxygen saturated atmospheric solution. Additional oxygen evolution experiments were performed with a gas phase chromatograph with a thermal conductivity detector.

Preparation of Nanocrystalline $LiMn_2O_4$

An aqueous solution of $Mn(OAc)_2 \cdot 4H_2O$ (5.0 mmol, 1.22 g) and $LiNO_3$ (2.5 mmol, 0.17 mg) was mixed with an aqueous solution of citric acid (15 mmol, 2.88 g) and urea (15 mmol, 0.90 g). Concentrated nitric acid was added to the starting solution in the volume ratio of 1:0.1. The solution was evaporated at 80° C. for about 4 to 6 h with continuous stifling to remove the water. The resulting resin was dried at 170° C. for 12 h and the volume of the resin was expanded significantly. The sponge-like resin was calcined at 300° C. for 12 h to get nanocrystalline $LiMn_2O_4$.

Preparation of $LiMn_2O_4$ Via Solid State Reaction

A mixture of $Li_2CO_3$ (1 mmol, 73.9 mg) and $Mn_2O_3$ (2 mmol, 316.4 mg) was ground and heated at 850° C. for 24 h in air.

Conversion of $LiMn_2O_4$ to $\lambda$-$MnO_2$ (1) To an aqueous suspension of $LiMn_2O_4$, was added a dilute $HNO_3$ solution while maintaining the solution pH around 2. After the acid treatment, the solution was decanted and washed with extra amount of $H_2O$ and dried at 90° C. in air. (2) 50 mg of $LiMn_2O_4$ was suspended in 3 ml of $CH_3CN$ and 1 ml of $Br_2$ was added, then stirred at room temperature for about 2-4 days. (3) Likewise, 50 mg of $LiMn_2O_4$ was suspended in 3 ml of $CH_3CN$ and 1 ml of $I_2$ solution in $CH_3CN$ was added, then stirred at room temperature for about 2-4 days.

Figure 2:
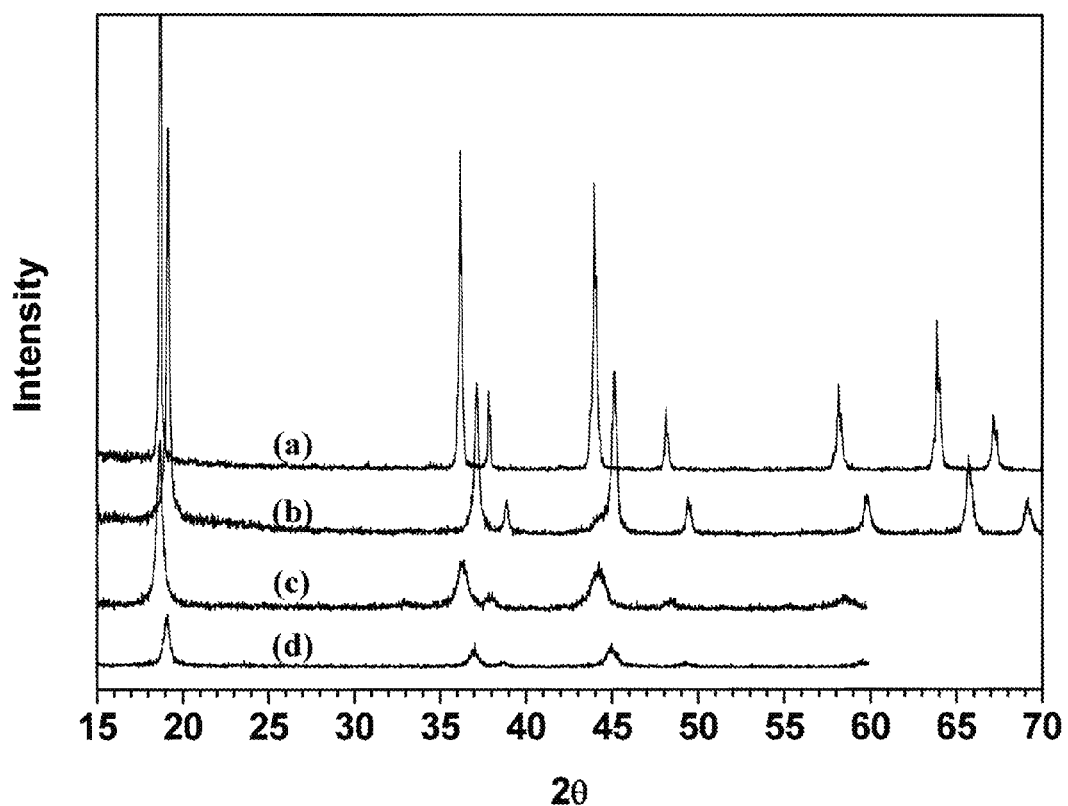
FIG. 2 is powder x-ray diffraction patterns of (a) $LiMn_2O_4$ (high temperature), (b) $\lambda$-$MnO_2$ (high temperature), (c) $LiMn_2O_4$ (low temperature), and (d) $\lambda$-$MnO_2$ (low temperature); diffraction peaks of the $\lambda$-$MnO_2$ show an equivalent up shift of $2\theta$.

Powder X-Ray Diffraction of High and Low Temperature $LiMn_2O_4$ and $\lambda$-$MnO_2$ Powder x-ray diffraction verifies the formation of spinel $LiMn_2O_4$ and reveals that the spinel structure is maintained in $\lambda$-$MnO_2$ after de-lithiation as shown FIG. 2. All diffraction peaks of the $\lambda$-$MnO_2$ material show an equivalent up shift of $2\theta$ equal to 3% and broadening, while maintaining the spinel pattern. The retention of the spinel pattern and complete delithiation upon acid treatment confirm the $\lambda$-$MnO_2$ material. Upon removal of the A site atoms, the cubical structure highlighted in FIG. 1(A) is maintained while creating nanochannels with approximate dimension of about 4.6 Å, as is exemplified in FIG. 1(c).

Scanning Electron Microscopy of High and Low Temperature $LiMn_2O_4$ and $\lambda$-$MnO_2$ Scanning Electron Microscopy (SEM) of the product of the high temperature method reveals crystalline particle sizes ranging from about 200 to 500 nm in diameter. With reference to FIG. 3, the delithiation treatment of the high temperature material with $HNO_3$ produced a material with a fractured crystal structure and visible imperfections on the crystal faces. The low temperature synthesis produces a range of smaller and more irregular crystallite sizes of about 20 nm, as seen in the SEM and confirmed by the broadening of the peak width X-ray diffraction patter in FIG. 2. The crystalline size of the $LiMn_2O_4$ (low temperature) and $\lambda$=$MnO_2$ (low temperature) powders was calculated by Scherrer's formula, with the full width at half maximum data of the 111 reflection observed at 18.68° $2\theta$, yielding an average crystalline size of about 20 nm and about 19 nm, respectively.

Catalytic Activity of $\lambda$-$MnO_2$ for Water Oxidation

Figure 5:
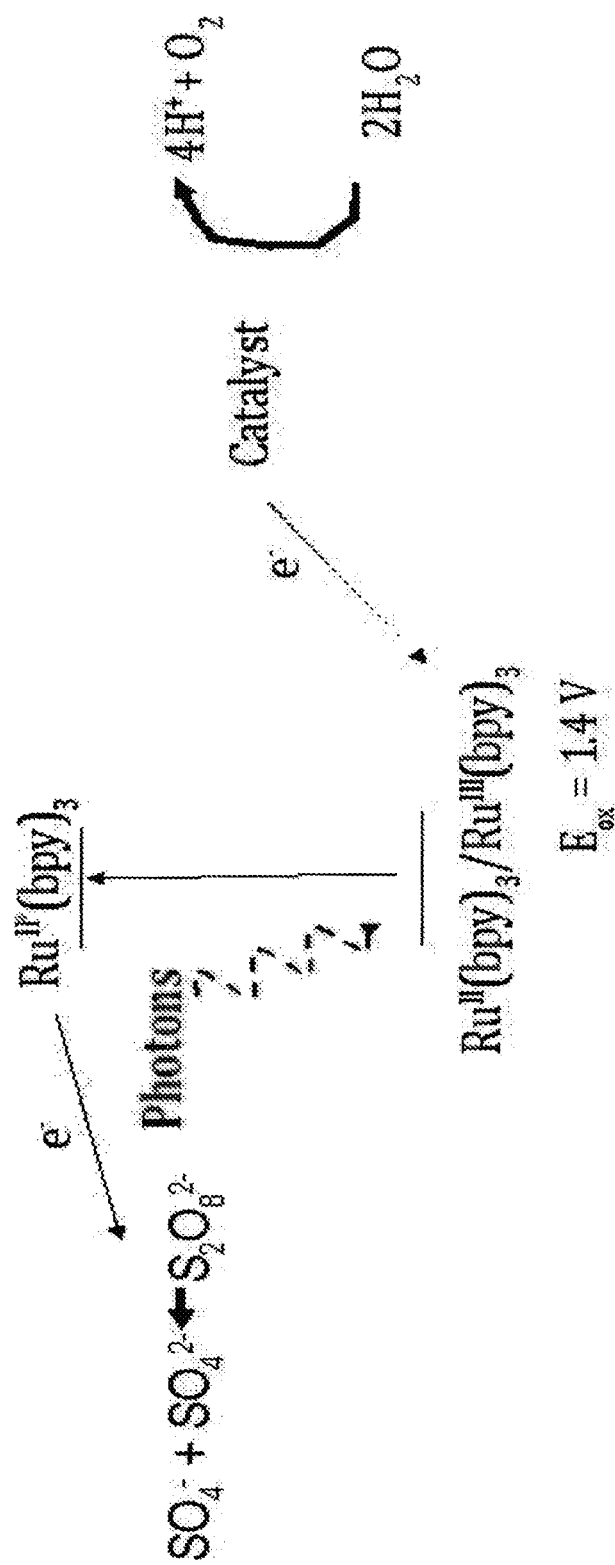
FIG. 5 illustrates a photon driven oxidation system used for solution phase water oxidation experiments.
Figure 6A:
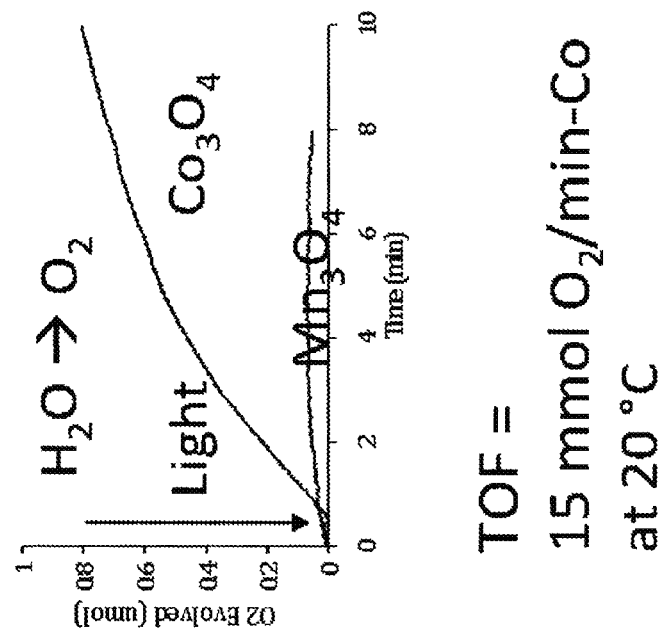
FIG. 6 illustrates perspective views, SEM images, and plots of $O_2$ evolution for (A) $Co_3O_4$ and $Mn_3O_4$ spinel nanocubes, and (B) delithiated spinel flexible $B_4O_8$ cubes and nanochannels.
Figure 6A:
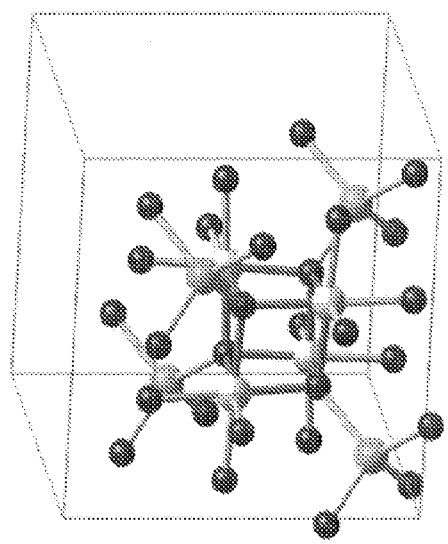
Figure 6A:
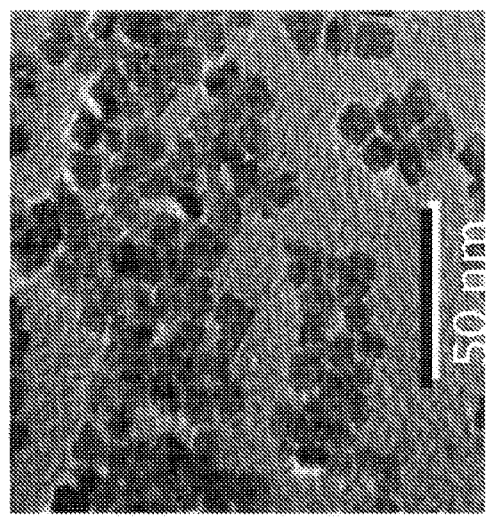
Figure 6B:
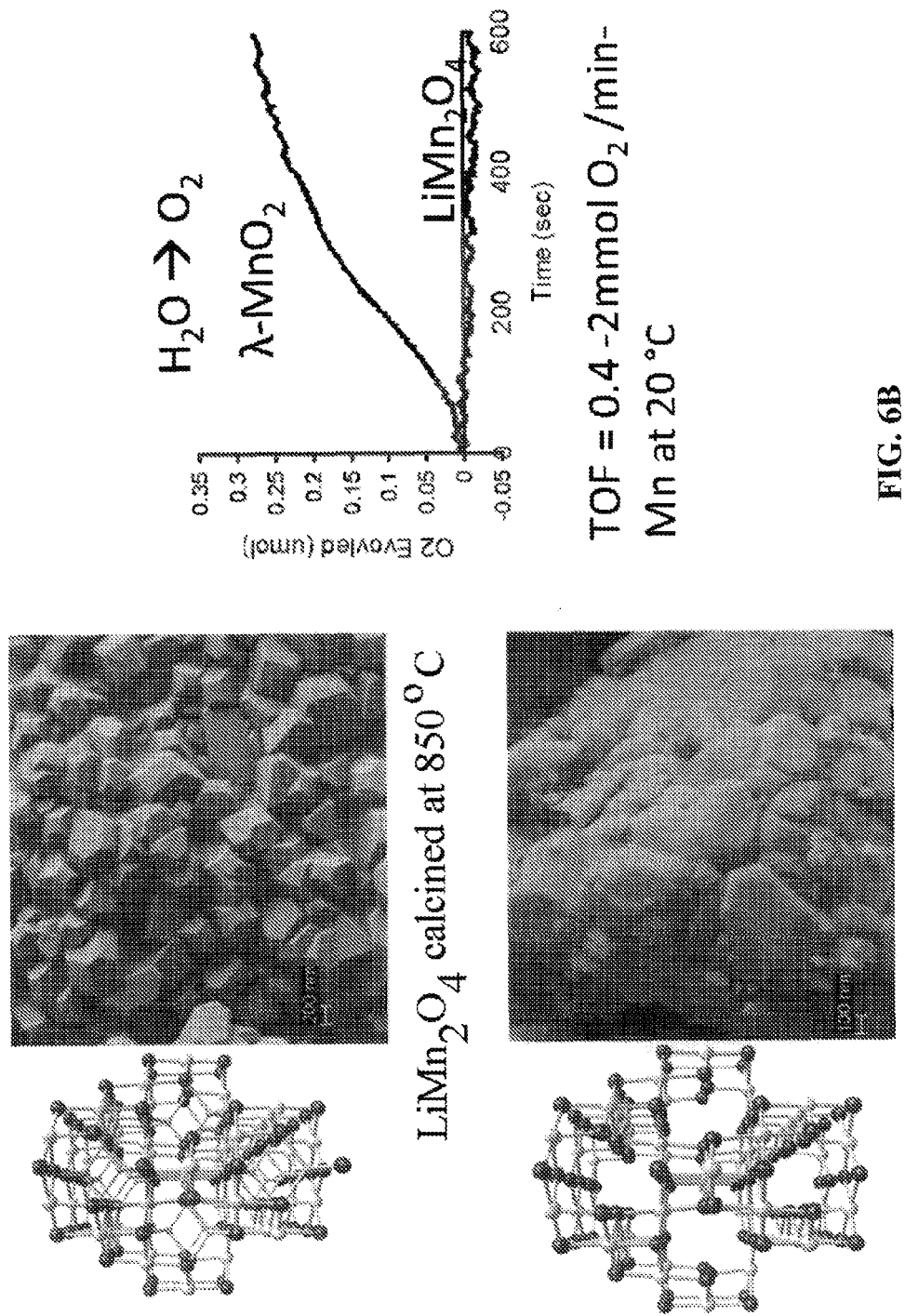
Figure 7:
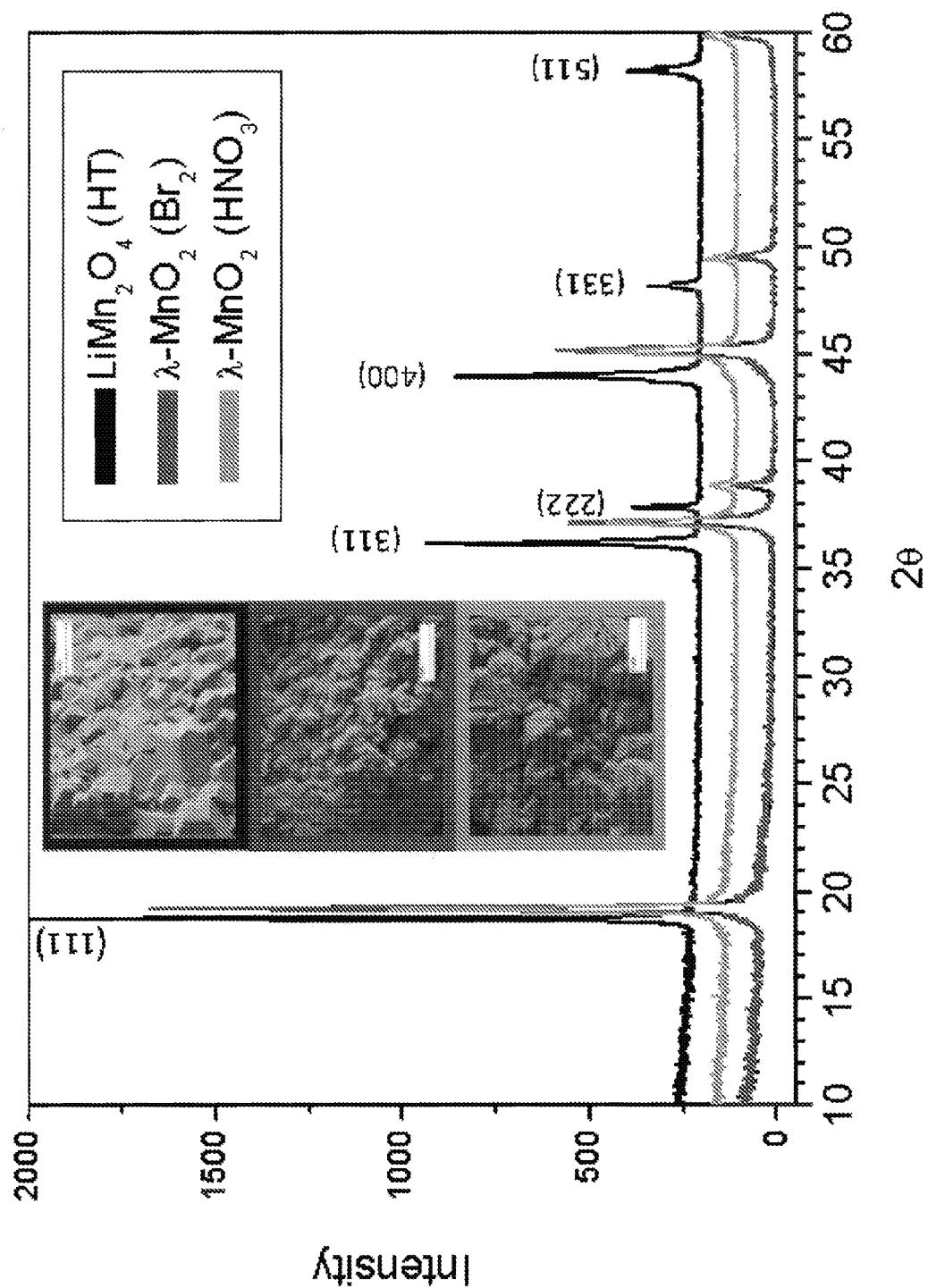
FIG. 7 illustrates SEM images and powder x-ray diffraction plots for spinel $LiMn_2O_4$ (HT), $\lambda$-$MnO_2$ ($Br_2$), and $\lambda$-$MnO_2$ ($HNO_3$) at the top, middle, and bottom, respectively.
Figure 8:
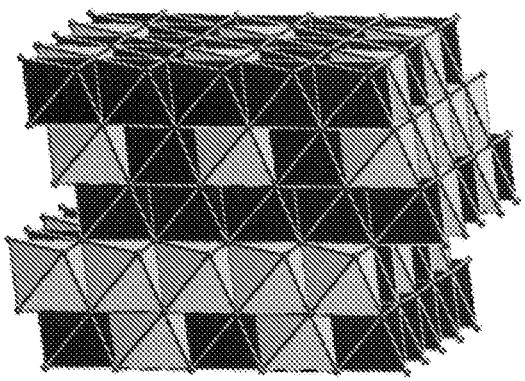
FIG. 8 illustrates polyhedral and ball and stick models of (A) spinel $Li_{1+y}Co_2O_4$ with a $Co_4O_4$ core, and (B) the layered $LiCoO_2$ with alternating metal layers. All metal centers are octahedrally coordinated.
Figure 8:
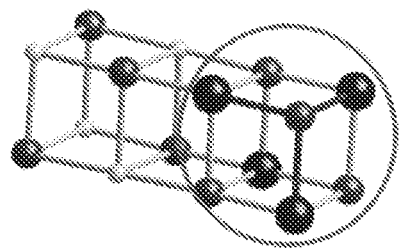
Figure 8:
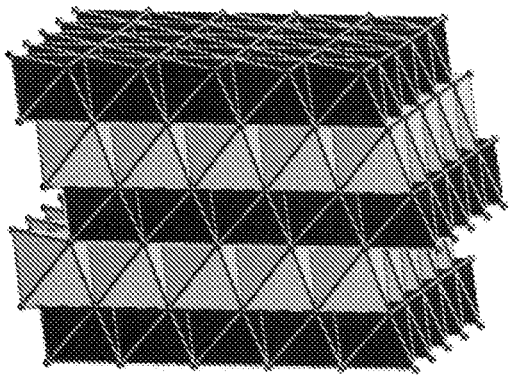
Figure 8:
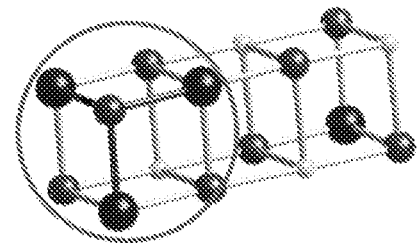

Catalytic water oxidation was monitored in solution through detection of dissolved $O_2$ by thermostated Clark-type electrode and confirmed by gas chromatography. Oxidative equivalents were provided through a standard photoexcitation system. With reference to FIG. 5, oxidizing equivalents were generated by photoexcitation of $[Ru(bpy)_3]^{2+}$ followed by reduction of persulfate to generate $[Ru(bpy)_3]^{3+}$ with a reduction potential of 1.26 V. Persulfate acts as an irreversible electron acceptor ($S_2O_8^{2-}+2e^- \rightarrow SO_4^{2-}$). $[Ru(bpy)_3]^{3+}$ drive the catalytic water oxidation by the metal oxide complexes.

Illumination was done using a 250 W industrial light source with UV filtered by Pyrex and IR with a 12 cm path water filter at intensity 20 mW cm$^{-2}$. The reaction vessel was fixed at a pH of about 5.8 in about 0.022 M $Na_2SiF_6$ and 0.028 M $NaHCO_3$ buffer with a 2 mL reaction chamber. The Ru-bpy/$S_2O_8$ system was used inside sealed and argon purged vials. Headspace gas volumes of about 200 L were extracted and inserted into the GC. Oxygen evolution rates were calculated in terms of moles of $O_2$ evolved per mole of Mn per minute.

Figure 4:
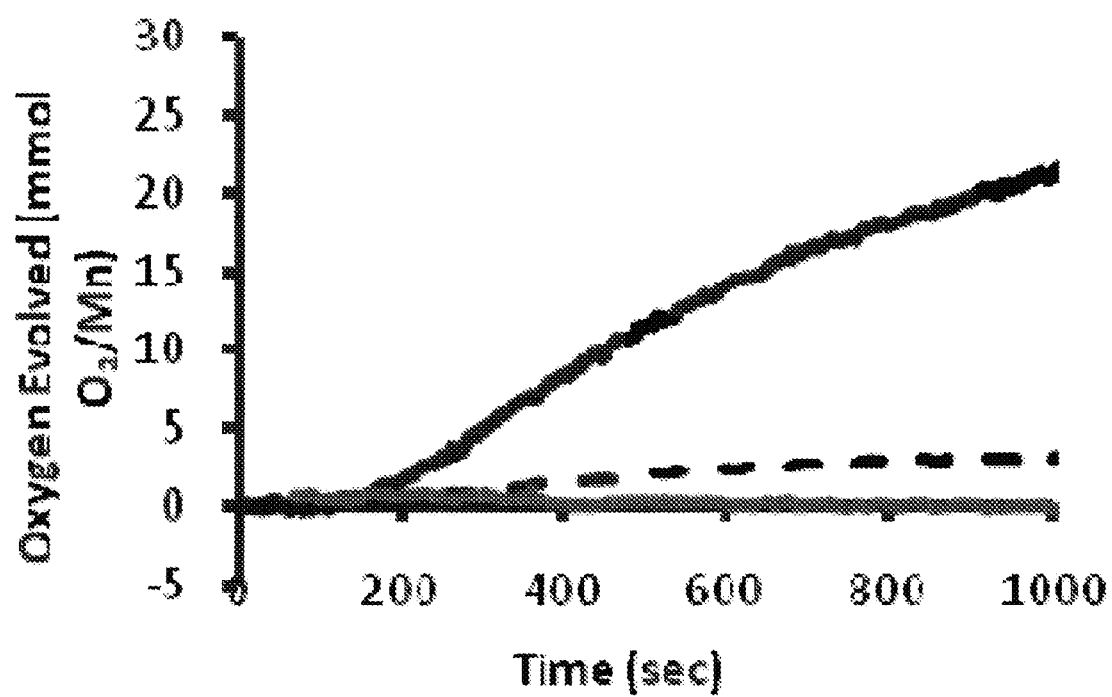
FIG. 4 illustrates oxygen evolution by Clark electrode measurements for low temperature $\lambda$-$MnO_2$ (black), high temperature $\lambda$-$MnO_2$ (dashed), and $LiMn_2O_4$ (gray).

As illustrated by FIG. 4, removal of Li from the $LiMn_2O_4$ structure creates an active $\lambda$-$MnO_2$ species which can be further activated by decreasing particle size. The porous channels produced with the $\lambda$-$MnO_2$ are not large enough for permeation of the $Ru(bpy)_3^{3+}$ oxidizing agent. Maximal oxygen evolution rates for the $\lambda$-$MnO_2$ are $0.0017\pm0.0003$ and $0.0003\pm0.0002$ $O_2$ per Mn per minute with the low and high temperature products, respectively.

Removal of the A site Li atom of the $LiMn_2O_4$ spinel material activated it for water oxidation. Removal of the A site renders the $Mn_4O_4$ cubical subunits flexible within the $\lambda$-$MnO_2$ structure which enables the O—O bond formation reaction to occur and $O_2$ product to be released. Decreasing particle size of the $\lambda$-$MnO_2$ phase leads to an increase in catalytic activity as it exposes more of the cubical subunits to the aqueous interface.

Similarly, a Li— and O— deficient $Li_xCo_2O_{4-\delta}$ spinel formed by acid treatment of low temperature $LiCoO_2$. This material was shown to catalytically evolve oxygen from water using both a Clark-type electrode to measure dissolved $O_2$ and the detection of visible bubble formation that was confirmed by gas chromatography to be $O_2$ gas. Neither starting material, $LiMn_2O_4$ nor low temperature $LiCoO_2$, exhibited appreciable catalytic activity in the bulk phase.

Synthesis of $LiCoO_2$ Nanoparticles

All reactants were reagent grade and used as purchased without further purification. An aqueous solution of $LiNO_3$ (0.276 g, 4 mmol), $Co(NO_3)_2.6H_2O$ (1.164 g, 4 mmol), citric acid (1.154 g, 8 mmol), and urea (0.481 g, 8 mmol) was evaporated at 80° C. for 6 hours to remove water. The resulting resin was calcined at 400° C., 500° C., 600° C., and 700° C., for 1-2 hours to yield nanocrystalline powder.

Characterization of $LiCoO_2$ Nanoparticles

Figure 11:
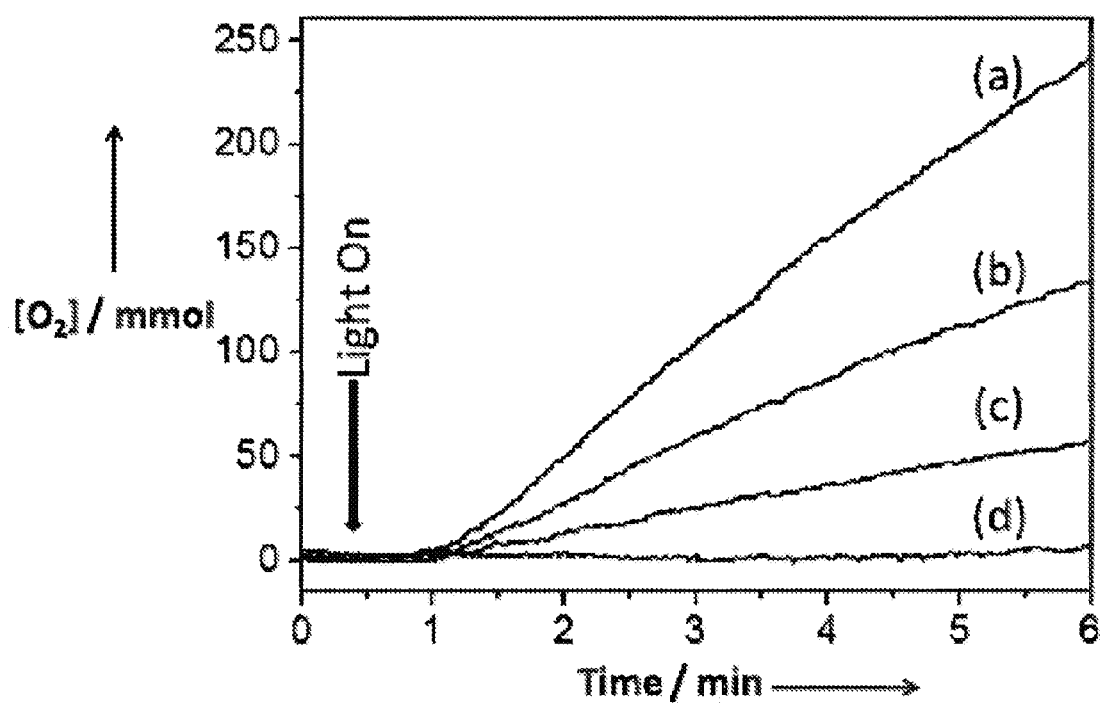
FIG. 11 illustrates oxygen evolution normalized to moles of Co by Clark electrode measurement at 23° C., pH 5.8 for lithium cobalt oxides synthesized at (a) 400° C., (b) 500° C., (c) 600° C., and (d) 700° C., wherein a lag time of 20 seconds occurs after illumination begins.
Figure 12:
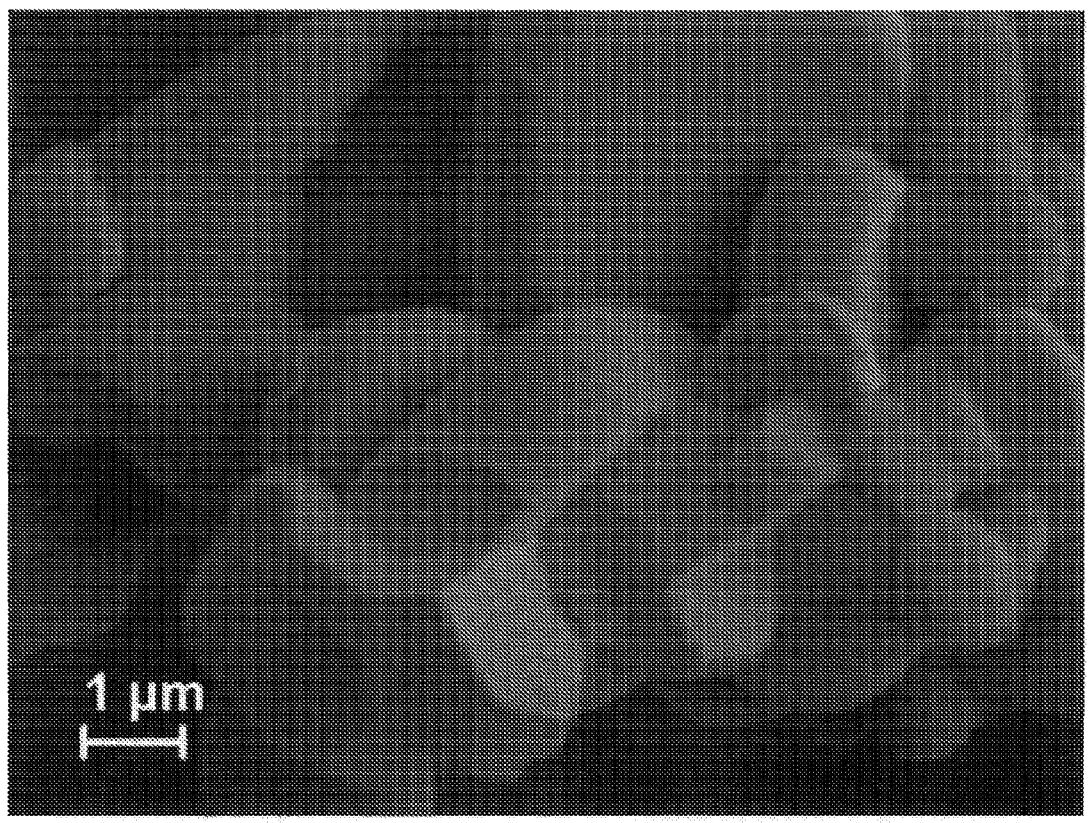
FIG. 12 illustrates an SEM image of layered $LiCoO_2$ synthesized by solid state reaction with metal carbonates at 800° C. for 12 hours; particle sizes are greater than 1 μm.
Figure 13:
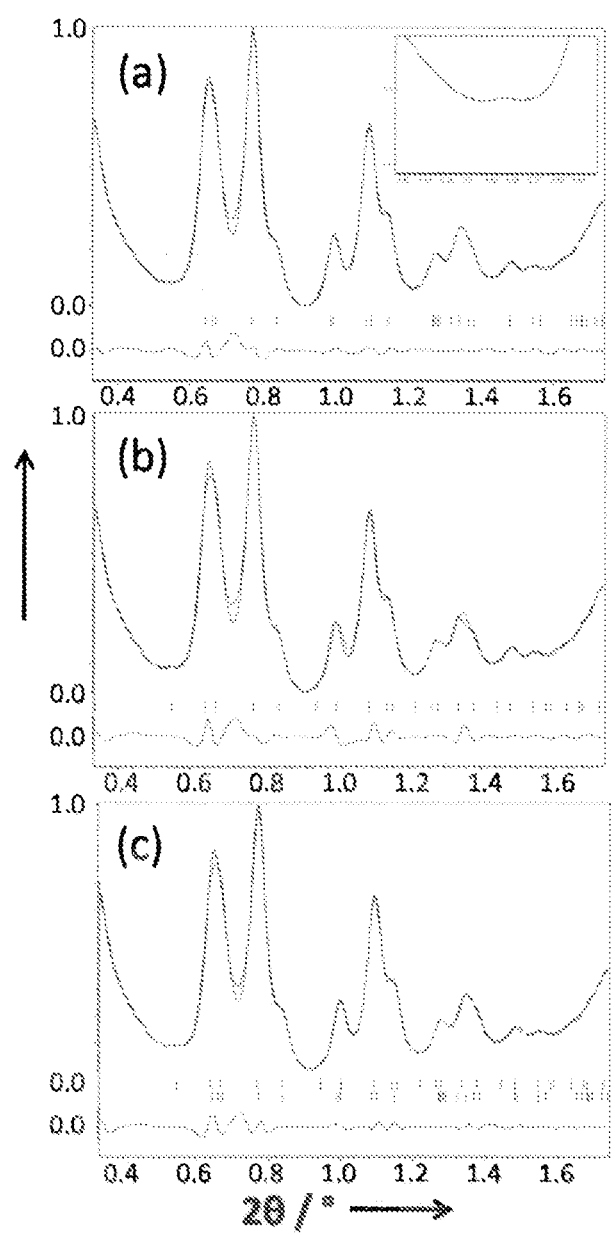
FIG. 13 illustrates a Le Bail fit of the experimental profile extracted from a PED ring pattern to (a) the layered phase, (b) the cubic phase, and (c) both phases together; the peak indicating the presence of the cubic phase can be seen in the inset.

Thermal analyses were performed on a TA Instrument 2050 thermal analyzer for room temperature to 600° C. with a heating rate of 5° C./min in nitrogen. $LiCoO_2$ particle morphologies and sizes were observed by scanning electron microscopy (Zeiss Sigma Field Emission SEM with Oxford EDSLEO FESEM), as illustrated in FIGS. 11 and 12. The powder X-ray diffraction (PXRD) patterns of the sample powders were collected on a Bruker D8 Advance diffractometer (Bragg-Brentano geometry, Cu K-$\alpha$ radiation). Precession electron diffraction (PED), as illustrated in FIG. 13, was performed on a Philips CM20 equipped with a Spinning Star precession instrument. PED patterns were recorded on a CCD camera. The line profile was extracted with the commercial software ELD. The profile was treated with the procedure described by V. Petricek et al., *Jana*2006, 2006.

The PXRD patterns illustrated in FIGS. 2(*a*)-(*d*) demonstrate a structural transformation with increasing temperature of synthesis from cubic spinel at 400° C. to rhombohedral layered phase above 600° C. A mixture of these two phases appears at 500° C. The splitting of the 222 and 440 peaks, as well as the shift of the 111 peak are indicative of the formation of the layered $LiCoO_2$. Heating is typically accompanied by a substantial increase in crystallinity and particle size when the samples are synthesized by a solid-state reaction. In contrast, the sol-gel preparation technique enables control of crystallite size to nano-dimensions.

Figure 3A:
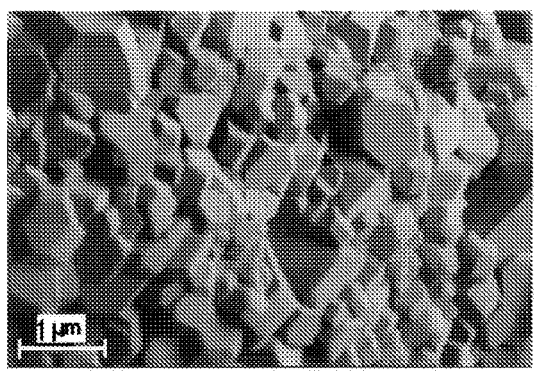
FIG. 3 is an SEM image of (A) $LiMn_2O_4$ (high temperature), (B) $\lambda$-$MnO_2$ (high temperature), (C) $LiMn_2O_4$ (low temperature), and (D) $\lambda$-$MnO_2$ (low temperature).
Figure 3B:
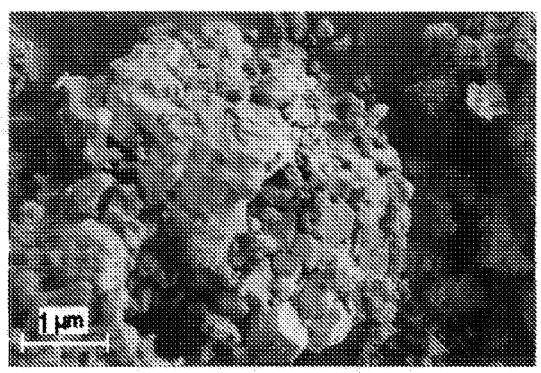
Figure 3C:
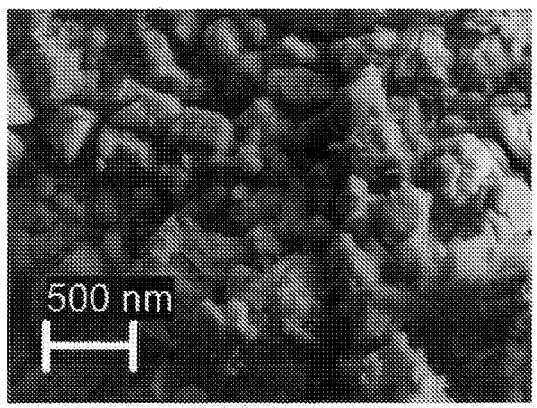
Figure 3D:
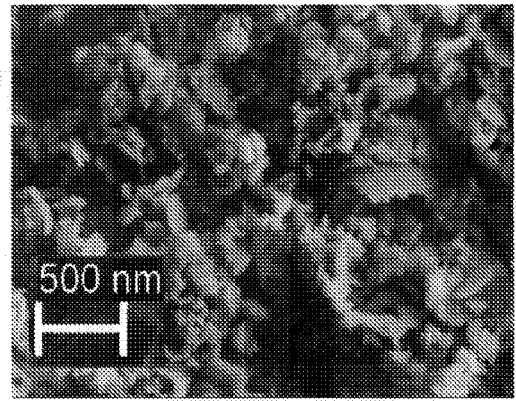

As illustrated in FIGS. 3(A)-(C), SEM images of the products reveal average particles sizes of 50 nm for the low temperature materials, and 100 nm for the highest temperature material, as illustrated in FIG. 3(D). The average particle size of layered $LiCoO_2$ prepared at 800° C. via solid state reaction was 1-2 μm, as illustrated in FIG. 12.

Catalytic Activity of Lithium Cobalt Oxides

Photocatalytic water oxidation was monitored in solution through detection of dissolved thermostatted Clark-type electrode. The potential needed to drive water oxidation was provided by a photosensitizer assay $(Ru(bpy)_3^{2+}/Na_2S_2O_8)$ in a pH 5.8 sodium hexafluorosilicate buffer adjusted with $NaHCO_3$. More particularly, the assay used was a solution of $1\times10^{-3}$ M $Ru(bpy)_3Cl_2.6H_2O$ and $2.0\times10^{-2}$ M $Na_2S_2O_8$ in a bicarbonate and sodium hexafluorosilicate buffer poised at pH 5.8, a commonly used photo-oxidant system. The catalyst suspensions tested were about 200 ppm and were sonicated for 5-10 minutes before measurements. The chamber was illuminated with a mercury arc lamp with filters for UV (395 nm cut-off filter) and IR ($CuSO_4$ solution) at a light intensity of 4.3 mW/cm$^2$ measured by a Newport power meter. Oxygen yield was confirmed on a GOW MAC Series 350 Gas Chromatograph with a thermal conductivity detector. Visible light-driven oxygen evolution traces, normalized to the number of moles of cobalt in solution, are shown in FIG. 4.

The catalyst turnover frequency (TOF) determined from the initial slope in FIG. 11(*a*) is $1.0\times10^{-3}$ s$^{-1}$ for pure spinel $Li_{1-x}Co_2O_4$ per cobalt atom. However, since only sites on the particle surfaces are known to be active in catalysis, this rate is considered a conservative, lower bound estimate. The catalytic activity decreases linearly with increased calcination temperature and corresponding change in crystal structure, as illustrated in FIGS. 11(*a*)-11(*c*). Pure layered $LiCoO_2$ exhibits no activity, as illustrated in FIG. 11(*d*). Although the 600° C. material is primarily layered based on the PXRD pattern in FIG. 9(*c*), the presence of some residual cubic spinel phase was established by precession electron diffraction (PED), as illustrated in FIG. 13 and described in further detail below. The small amount of cubic spinel $Li_{1-x}Co_2O_4$ present in the 600° C. material is responsible for the low $O_2$ evolution activity in FIG. 11(*c*). The consistent trend in FIGS. 11(*a*)-11(*d*) demonstrates the requirement for the cubical $M_4O_4$ core for catalysis of water oxidation.

Characterization of 600° C. $LiCoO_2$ Material

The presence of the cubic phase is shown with precession electron diffraction (PED). PED ring patterns of the sets of nanoparticles were taken, after which a line profile was extracted radially through the pattern. This line profile was analyzed with a Le Bail fit described by V. Petricek et al., *Jana*2006, 2006. As shown in FIG. 13(*b*), the profile agrees well with the layered phase, except for the presence of a peak around d=0.54 Å (inset in FIG. 13(*a*)). The presence of the peak agrees with the cubic phase, as illustrated in FIG. 13(*b*), whereas the overall agreement of the whole pattern is less than with the layered phase. The combination of both phases, as illustrated in FIG. 13(*c*), gives the best agreement.

What is claimed is:

1. A catalyst for the photo-electrolysis of water molecules, said catalyst comprising group comprising $A_{1-x}B_{2-y}B'_yO_4$ spinels having a cubical $M_4O_4$ core, wherein A is Li or Na, B and B' are independently any transition metal or main group metal, M is B, B', or both, x is a number from 0 to 1, and y is a number from 0 to 2, and further comprising a conductive support substrate supporting a plurality of the catalytic groups and capable of incorporating water molecules, wherein at least some of the catalytic groups supported by the support substrate are able to catalytically interact with water molecules incorporated into the support substrate.

2. The catalyst of claim 1, wherein B and B' are independently selected from the group consisting of Ti, V, Cr, Mn, Fe, Co, Ni, Cu, and combinations of these.

3. The catalyst of claim 1, wherein B and B' are independently selected from the group consisting of Mn, Co, and combinations of these.

4. The catalyst according to claim 1, wherein
the support substrate has hydrophobic regions and hydrophilic regions;
at least some of the catalytic groups are supported in the hydrophobic regions of the support substrate and the water molecules are capable of being incorporated in the hydrophilic regions of the substrate; and
at least some of the catalytic groups supported in the hydrophobic regions are able to catalytically interact with water molecules in the hydrophilic regions.

5. The catalyst according to claim 4, wherein the hydrophobic regions are formed by a hydrophobic polymer backbone.

6. The catalyst according to claim 4, wherein the hydrophilic regions are regions of ionizable functional groups.

7. The catalyst according to claim 6, wherein the ionizable functional groups are sulphonated fluoro polymer.

8. The catalyst according to claim 4, further including a chemical relay system capable of electrochemically oxidizing the catalytic groups thereby assisting in the regeneration of the catalytic groups.

9. The catalyst according to claim 8, wherein the chemical relay is a photo electrochemical relay system in the form of a photo-active dye.

10. The catalyst according to claim 9, wherein the photo-active dye is a ruthenium polypyridyl dye.

11. The catalyst of claim 1, having a particle size of about 20 nm to about 500 nm.

12. A method for the electrolytic hydrolysis of water, wherein the improvement comprises contacting water with a catalyst of claim 1.

13. A method for the oxidation of hydrocarbons comprising the continuous thermal conversion of alkanes to alcohols, where the improvement comprises contacting the alkanes with a catalyst of claim 1.

14. A photo-anode for the electrolysis of water comprising:
(1) an electrode substrate; and
(2) a catalyst for the photo-electrolysis of water molecules, the catalyst including:
(a) catalytic groups comprising $A_{1-x}B_{2-y}B'_{y}O_4$ spinels having a cubical $M_4O_4$ core, wherein A is Li or Na, B and B' are independently any transition metal or main group metal, M is B, B', or both, x is a number from 0 to 1, and y is a number from 0 to 2; and
(b) a conductive support substrate supporting a plurality of the catalytic groups and capable of incorporating water molecules,
wherein at least some of the catalytic groups supported by the support substrate are able to catalytically interact with water molecules incorporated into the support substrate.

15. The photo-anode according to claim 14, wherein B and B' are independently selected from the group consisting of Mn, Co, and combinations of these.

16. The photo-anode according to claim 15, wherein there are multiple layers between the electrode substrate and the catalyst, the layers comprising:

a semiconductor; and
a photo-electrochemical relay system contacting the semiconductor and capable of electrochemically oxidizing the catalytic groups thereby assisting in the regeneration of the catalytic groups.

17. A photo-electrochemical cell for the electrolysis of water comprising:
(1) a chamber capable of containing an aqueous electrolyte;
(2) a cathode in contact with the aqueous electrolyte when the chamber contains the aqueous electrolyte; and
(3) a photo-anode comprising:
(a) an electrode substrate; and
(b) a catalyst for the photo-electrolysis of water molecules, the catalyst comprising:
(i) catalytic groups comprising $A_{1-x}B_{2-y}B'_{y}O_4$ spinets having, a cubical $M_4O_4$ core, wherein A is Li or Na, B and B' are independently any transition metal or main group metal, M is B, B', or both, x is a number from 0 to 1, and y is a number from 0 to 2; and
(ii) a conductive support substrate supporting a plurality of the catalytic groups and capable of incorporating water molecules;
wherein at least some of the catalytic groups supported by the support substrate are able to catalytically interact with water molecules incorporated into the support substrate,
said photo-anode capable of being electrically connected to said anode in contact with the aqueous electrolyte when the chamber contains the aqueous electrolyte.

18. The photo-electrochemical cell according to claim 17, wherein B and B' are independently selected from the group consisting of Mn, Co, and combinations of these.

19. The photo-electrochemical cell according to claim 18, wherein the chamber contains an aqueous electrolyte.

20. A method for preparing a photo-electrochemical cell for use in the photo-electrolysis of water, the method including the steps of:
(i) providing a conductive support substrate capable of incorporating water molecules;
(ii) allowing catalytic groups comprising $A_{1-x}B_{2-y}B'_{y}O_4$ spinels having a cubical $M_4O_4$ core, wherein A is Li or Na, B and B' are independently any transition metal or main group metal, M is B, B', or both, x is a number from 0 to 1, and y is a number from 0 to 2, to self-assemble on the support substrate so that at least some of the catalytic groups are able to catalytically interact with the water molecules;
(iii) coating the support substrate having the catalytic groups assembled thereon onto an electrode substrate to provide a photo-anode;
(iv) providing a cathode and forming an electrical connection between the photo-anode and the cathode; and
(v) providing an aqueous electrolyte between the photo-anode and the cathode to provide a photo-electrochemical cell.

21. The method of preparing a photo-electrochemical cell of claim 20, wherein B and B' are independently selected from the group consisting of Mn, Co, and combinations of these.

* * * * *